United States Patent
Goldberg et al.

(10) Patent No.: US 6,404,872 B1
(45) Date of Patent: Jun. 11, 2002

(54) METHOD AND APPARATUS FOR ALTERING A SPEECH SIGNAL DURING A TELEPHONE CALL

(75) Inventors: Randy G. Goldberg, Princeton; Kenneth H. Rosen; Richard M. Sachs, both of Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/937,947

(22) Filed: Sep. 25, 1997

(51) Int. Cl.[7] ........................ H04M 1/64; H04M 11/00; H04M 3/42
(52) U.S. Cl. ........................ 379/201.11; 379/88.13; 379/88.16; 379/93.21; 379/201.02; 379/88.07
(58) Field of Search ................. 379/67.1, 68, 88.13, 379/88.16, 93.21, 93.33, 100.15, 158, 201, 202, 338, 339, 88.07, 88.06, 88.04, 88.17, 201.01, 201.02, 201.4, 201.11; 381/61; 704/261, 270, 40; 380/253, 275

(56) References Cited

U.S. PATENT DOCUMENTS

| | | | | |
|---|---|---|---|---|
| 3,651,268 A | * | 3/1972 | Rivkin | 380/253 |
| 3,976,839 A | * | 8/1976 | Miller | 380/41 |
| 4,241,235 A | * | 12/1980 | McCanney | 381/61 |
| 4,742,550 A | * | 5/1988 | Fette | 381/36 |
| 5,113,449 A | * | 5/1992 | Blanton et al. | 704/261 |
| 5,278,943 A | * | 1/1994 | Gasper et al. | 704/270 |
| 5,386,493 A | * | 1/1995 | Degen et al. | 395/2.76 |
| 5,515,296 A | * | 5/1996 | Agarwal | 364/514 R |
| 5,692,213 A | * | 11/1997 | Goldberg et al. | 395/806 |
| 5,787,151 A | * | 7/1998 | Nakutsu et al. | 379/67 |
| 5,812,126 A | * | 9/1998 | Richardson et al. | 345/330 |
| 5,884,972 A | * | 3/1999 | Gasper | 704/270 |
| 5,911,129 A | * | 6/1999 | Towell | 704/272 |
| 5,933,808 A | * | 8/1999 | Kang et al. | 704/278 |
| 5,943,648 A | * | 8/1999 | Tel | 704/260 |
| 5,991,385 A | * | 11/1999 | Dunn et al. | 379/202 |
| 6,018,710 A | * | 1/2000 | Wynblatt et al. | 704/260 |
| 6,035,273 A | * | 3/2000 | Spies | 704/270 |
| 6,064,737 A | * | 5/2000 | Rhoads | 380/23 |

* cited by examiner

Primary Examiner—Allan Hoosain
(74) Attorney, Agent, or Firm—Kenyon & Kenyon

(57) ABSTRACT

A network that establishes a telephone call between a calling party and a called party and alters speech signals generated by the calling party during the telephone call. The network includes a network node that is coupled to the transmit channel of the calling party and the receive channel of the called party. The network node is programmed to receive a request to establish the telephone call from the calling party and receive a selection of a speech signal alteration from the calling party. The network node initiates the telephone call to the called party. Further, the network node alters the speech signal of the calling party based on the speech signal alteration selection.

27 Claims, 2 Drawing Sheets

METHOD AND APPARATUS FOR ALTERING A SPEECH SIGNAL DURING A TELEPHONE CALL

FIELD OF THE INVENTION

The present invention is directed to a telephone network. More specifically, the present invention is directed to a telephone network that alters a speech signal during a telephone call.

BACKGROUND OF THE INVENTION

In an ordinary telephone call between two callers, the speech signal received by a called party reproduces the original voice of a calling party, and vice versa. In order to enhance the reproduction, a network that transmits the telephone call typically performs speech processing on the speech signals. Examples of known speech processing done by networks on speech signals include automatic gain control, background noise suppression, echo cancellation and frequency equalization. Typically, the speech processing is automatically performed by the network during all telephone calls.

However, for various reasons, the calling party might desire that the called party hear an altered or distorted version of the calling party's voice that is selectable by the calling party. For example, a calling party might want to disguise their voice so that the called party thinks that they are speaking to someone other than the calling party. Further, a calling party might want the called party to believe that the call is originating from a different location or environment than where the call is actually originating from. One example of this is a calling party calling from a land-based phone who wants the called party to believe that the call is originating from a cellular wireless phone. In this example, the calling party may want to pretend that the "cellular" signal has deteriorated and therefore have an excuse to hang up on the called party.

There are known devices that allow a calling party to disguise their voice. For example, with some devices a man's voice can be altered so that it sounds like a woman's voice, or a voice of another person. These known devices can be coupled to a calling party's telephone so that the called party hears the altered voice.

However, there are disadvantages with using these known devices to alter the calling party's voice. For one, they require the calling party to acquire the device and learn how to use it. Further, these devices typically alter the voice while it is in analog form. In most networks, however, a speech signal received from an analog telephone is first digitized, then delivered to one or more telephone switches, then converted back into analog form before being sent to the called party. This analog-to-digital ("A/D") and digital-to-analog ("D/A") conversion can reduce the quality of the speech signal alteration, especially when the alteration is subtle as with the cellular phone example. Further, known digital speech processing techniques cannot be used to alter analog signals. These known techniques produce more accurate speech signal alterations than when analog speech is altered.

Moreover, even if the known devices first digitize the speech signal before altering it, the digitized speech signal must be converted back to analog before being sent to the network if the call is originating from a typical analog phone. Therefore, the speech signal is subject to even more A/D and D/A conversions, which results in a reduced quality of the alterations.

Further, if the calling party is involved in a multi-party call, the calling party may desire that their voice be altered differently for each called party, or that their voice be altered for one called party and not altered for another. This is not possible if the voice is altered at the calling party's telephone.

Based on the foregoing, there is a need for a method and apparatus for altering a speech signal through speech processing that is selectable by the calling party, that does not require the calling party to obtain or use complicated voice alteration equipment, that processes a digitized speech signal while reducing the number of D/A and A/D conversions, and that enables the calling party's voice to sound different to multiple called parties during multi-party calls.

SUMMARY OF THE INVENTION

One embodiment of the present invention is a network that establishes a telephone call between a calling party and a called party and alters speech signals generated by the calling party during the telephone call. The network includes a network node that is coupled to the transmit channel of the calling party and the receive channel of the called party.

The network node is programmed to receive a request to establish the telephone call from the calling party and receive a selection of a speech signal alteration from the calling party. The network node initiates the telephone call to the called party. Further, the network node alters the speech signal of the calling party based on the speech signal alteration selection.

DETAILED DESCRIPTION

The present invention alters a speech signal during a telephone call. The speech signal can be altered by, for example, degrading the quality of the speech signal or changing the speech signal so that it no longer accurately reproduces the source of the speech signal.

Figure 1:
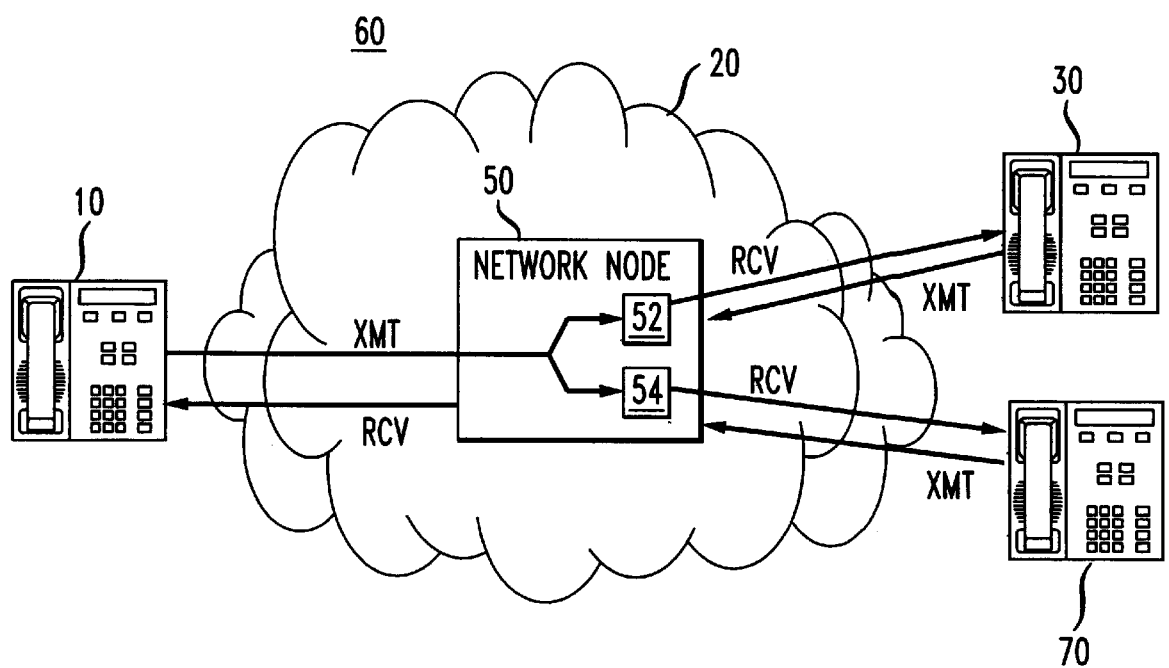
FIG. 1 illustrates an exemplary system that includes one embodiment of the present invention.

FIG. 1 illustrates an exemplary system that includes one embodiment of the present invention. In the system 60 shown in FIG. 1, a calling party initiates a telephone call by using a telephone 10. A called party receives the telephone call using a telephone 30. An additional called party in a multi-party call receives the call using a telephone 70.

Phones 10, 30 and 70 are each coupled to a network 20 via a transmit channel and a receive channel. Network 20 can be any network that enables the calling party to initiate and complete the telephone call to the called party. For example, in one embodiment of the present invention, network 20 is the Public Switched Telephone Network ("PSTN"). Other examples of network 20 include a local area network, the Internet, or an Intranet. As with most known networks, all speech signals entering network 20 that are generated by analog telephones are initially digitized by network 20. Switching and processing by network 20 is performed on the digitized speech signals. The speech signals are then converted back to analog form before being transmitted to analog telephones.

A network node 50 is coupled to phones 10, 30 and 70 through network 20. Network node 50 is one of the nodes within network 20 that a telephone call between phone 10, phone 30 and phone 70 passes through. In one embodiment of the present invention, node 50 is the PSTN switch local to phone 10. In another embodiment, node 50 is a computer server, or a computer server coupled to a local or long distance PSTN switch.

Network node 50 includes an audio processor dedicated to each called party. Each audio processor is coupled to the transmit channel of the calling party's phone and the receive channel of the called party's phone. For example, in FIG. 1, audio processors 52, 54 are coupled to the transmit channel of phone 10 and the receive channels of phones 30 and 70.

Audio processors 52, 54 alter the digitized speech signal of the calling party received over network 20 using digital speech processing techniques. One example of digital speech processing performed by audio processors 52, 54 is applying a speech coder to the calling party's speech signal so that the speech signal received by the called parties resembles a typical low-bit-rate speech signal from a cellular wireless phone. The speech processing in this example can include simulated channel fading.

Another example of digital speech processing is to add an appropriate reverberation or echo to the calling party's speech signal so that the calling party sounds like a radio station announcer to the called parties.

Further, audio processors 52, 54 can alter the speech signal of the calling party so that the speech signal sounds like it was generated by a different person than the calling party.

Other examples of digital speech processing that can be used to alter the calling party's speech signal include frequency equalization, pitch alteration, and non-linear and linear amplification.

Figure 2:
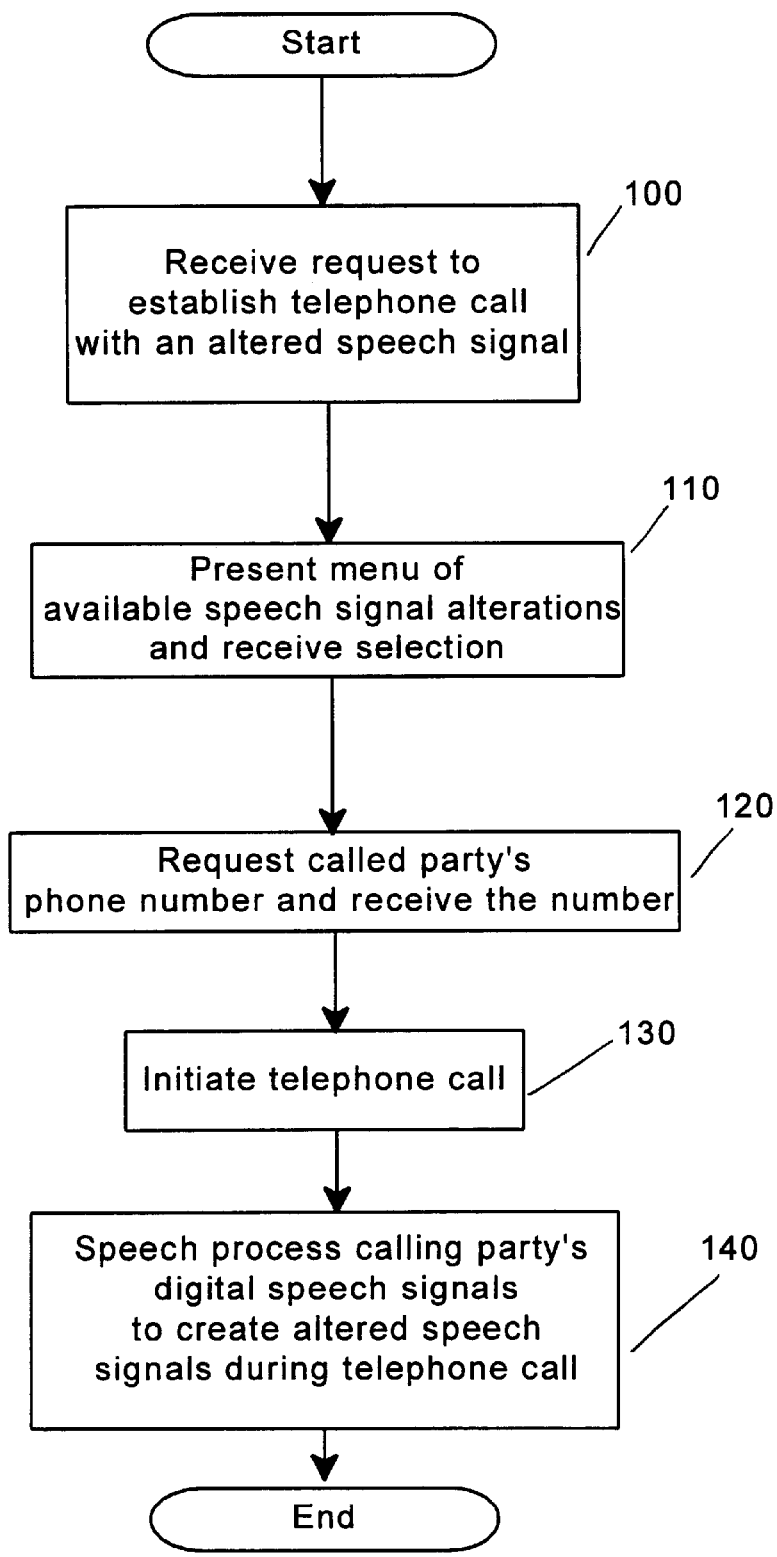
FIG. 2 is a flowchart illustrating the steps performed by a network node in accordance with one embodiment of the present invention when a call is initiated by a calling party.

FIG. 2 is a flowchart illustrating the steps performed by network node 50 in accordance with one embodiment of the present invention when a call is initiated by a calling party on phone 10. When the calling party desires to use the system to alter their speech signal, the calling party initiates the call by dialing a phone number associated with network node 50.

At step 100, network node 50, as a result of the calling party initiating the call, receives a request to establish a telephone call with an altered speech signal from phone 10.

At step 110, network node 50 presents to the calling party at phone 10 a menu of available speech signal alterations that can be applied to the telephone call. The menu of available speech signal alterations coincides with the digital speech processing options included on audio processors 52, 54. For example, the menu can include categories of speech signal alterations such as famous voices, locations or environments (e.g., cellular phone), specific types of alterations (e.g., reverberation, pitch alteration), etc. The categories, when selected, can have sub-menus such as names of well-known people that the calling party's speech signals can be altered to sound like. The choices presented to the calling party are selectable by touch-tone or speech recognition. The calling party can then select a speech signal alteration, or speech signal alterations for a multi-party call, from the menu. Network node 50 then receives the choice of speech signal alterations from the calling party.

At step 120, network node 50 asks the calling party for the phone number of the called party at phone 30, and the phone number of the called party at phone 70 and of other additional called parties as needed if a multi-party call is desired. The phone number is then entered by the calling party using, for example, touch-tone or speech recognition.

At step 130, network node 50 initiates the telephone call to phone 30 and any other requested phones in a known manner.

When the phone call is answered by the called party or parties, at step 140 the calling party's voice signals are altered based on the selected speech signal alteration at step 110 using digital speech processing techniques previously described.

As described, the telephone network in accordance with the present invention alters the calling party's speech signal that is received by the called parties. Therefore, the caller that desires an altered speech signal does not have to provide or use voice alteration equipment. Further, the calling party can select what type of speech alteration should be performed on their speech signal, and when it should be implemented. In addition, with the present invention the speech signal is altered after it is digitized within the network, thereby enhancing the quality of the alteration and reducing the number of A/D and D/A conversions. Further, in a multi-party call, the calling party's speech signal can be altered differently for each called party.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, the alteration of the calling party's speech signal, instead of being generated when the telephone call is initiated, can be generated at a specific time frame. One example of this is the cellular phone simulation alteration described above. The calling party may wish this alteration to increase at a point in the telephone call where the calling party needs an excuse to hang up on the called parties. The processor altering the speech signals can listen for the calling party to press a specific number on the telephone keypad (the resulting DTMF tone can be blocked from reaching the called parties), or listen, using voice recognition, for the calling party to say a specific word or words. The processor can then increase the alteration so that the voice signals are severely degrader. Speech signal alterations can be turned on or off throughout a telephone call in a similar manner.

In addition, in an alternative embodiment, a code or identifier can be preassigned to each choice of speech signal alteration. The code can be entered by the calling party after the initial call setup. Therefore, a menu of speech signal alterations does not need to be presented to the calling party.

Further, the present invention is not limited to only the calling party requesting that their speech signal be altered during a telephone call. For example, network node 50 can be a called party's local switch. The called party can request the network node 50 (in advance of calls or during a call) to alter their speech signal during all incoming calls, or during preselected incoming calls based on automatic number identification ("ANI"). The called party can also store a speech signal alteration identifier that identifies the type of speech signal alteration desired by the called party. Therefore, a calling party during a telephone call to the called party will hear a altered speech signal of the called party during the telephone call.

What is claimed is:

1. A method of establishing a telephone call between a calling party and a first called party through a network, wherein the calling party generates a speech signal, said method comprising the steps of:

receiving a request to establish the telephone call from the calling party;

receiving, in said network, a selection of a first speech signal alteration from the calling party;

initiating the telephone call to the first called party; and altering the speech signal in the network based on the first speech signal selection, wherein the altered speech signal is used to produce speech sounding different from speech of the calling party.

2. The method of claim 1, further comprising the step of sending the altered speech signal based on the first speech signal alteration to the first called party.

3. The method of claim 1, further comprising the step of converting the speech signal from analog to digital before altering the speech signal.

4. The method of claim 3, further comprising the step of converting the speech signal from digital to analog after altering the speech signal.

5. The method of claim 2, wherein the telephone call is further between a second called party, said method comprising the steps of:

receiving a selection of a second speech signal alteration from the calling party;

initiating the telephone call to the second called party; and altering the speech signal based on the second speech signal alteration selection.

6. The method of claim 5, further comprising the step of sending the altered speech signal based on the second speech signal alteration to the second called party.

7. The method of claim 1, wherein the altering step comprises the step of degrading the speech signal.

8. The method of claim 1, wherein the altering step comprises the step of enhancing the speech signal.

9. The method of claim 1, wherein the calling party generates the speech signal using a first voice, wherein the altering step comprises the step of modifying the speech signal to reproduce a second voice that differs from the first voice.

10. The method of claim 1, wherein the network is a Public Switched Telephone Network.

11. The method of claim 1, further comprising the step of presenting a menu of one or more speech signal alterations to the calling party.

12. A network for transmitting a speech signal generated by a first telephone during a telephone call between the first telephone and a second telephone, said network comprising:

a network node having a processor coupled to a transmit channel of the first telephone and a receive channel of the second telephone;

wherein said processor is programmed to alter the speech signal based on a speech signal alteration selection received from the first telephone, and the altered speech signal is used to produce speech sounding different from speech used to produce the speech signal.

13. The network of claim 12, wherein said processor is programmed to:

receive a request to establish the telephone call from the first telephone; and initiate the telephone call to the second telephone.

14. The network of claim 13, wherein said processor is programmed to:

present a menu of one or more speech signal alterations to the first telephone; and receive a selection of a first speech signal alteration from the first telephone, wherein the speech signal is altered based on the first speech signal alteration selection; and send the altered speech signal based on the first speech signal alteration to the second telephone.

15. The network of claim 12, wherein the speech signal is in digital form when it is within the network.

16. The network of claim 15, wherein the speech signal is in analog form when it is generated by the first telephone.

17. The network of claim 14, wherein the telephone call is further between a third telephone, and wherein said network node is programmed to:

receive a selection of a second speech signal alteration from the first telephone;

initiate the telephone call to the third telephone;

alter the speech signal based on the second speech alteration; and send the altered speech signal based on the second speech signal alteration to the third telephone.

18. The system of claim 12, wherein said network node is a telephone switch.

19. The system of claim 12, wherein said network is a Public Switched Telephone Network.

20. A method of altering a speech signal generated by one party during a telephone call between a plurality of parties through a network, said method comprising the steps of:

receiving a signal from the one party to alter the speech signal;

digitizing the speech signal; and altering the speech signal in the network based on a preselected speech signal alteration identifier from the one party, wherein the altered speech signal is used to produce speech sounding different from speech of the one party.

21. The method of claim 20, wherein the one party is a calling party.

22. The method of claim 20, wherein the one party is a called party.

23. The method of claim 20, wherein the signal is a touch-tone.

24. The method of claim 20, wherein the signal is a portion of the digitized speech signal.

25. A method of altering a speech signal generated by a called party during a telephone call between a calling party and the called party, said method comprising the steps of:

storing a speech signal alteration identifier in a network node local to the called party;

initiating the telephone call; and altering the speech signal based on the speech signal alteration identifier, wherein the altered speech signal is used to produce speech sounding different from speech of the called party.

26. The method of claim 25, wherein the called party stores the speech signal alteration identifier.

27. The method of claim 26, wherein said step of altering the speech signal is in response to receiving an automatic number identification.

* * * * *